(12) United States Patent
Rutigliano et al.

(10) Patent No.: US 8,474,371 B2
(45) Date of Patent: Jul. 2, 2013

(54) FRYING APPARATUS AND METHOD

(75) Inventors: Gerard A. Rutigliano, Ridgefield, CT (US); John Joseph Black, Jr., Canton, CT (US); Ting Chung Chan, Shatin (HK); Frank R. Chiappetta, Woodbury, CT (US); Dannie L. McMichael, New Hartford, CT (US); Daniel L. Sanders, Torrington, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 13/286,800

(22) Filed: Nov. 1, 2011

(65) Prior Publication Data

US 2013/0108758 A1 May 2, 2013

Related U.S. Application Data

(62) Division of application No. 13/286,583, filed on Nov. 1, 2011.

(51) Int. Cl.
*A47J 37/12* (2006.01)
*A47J 37/00* (2006.01)

(52) U.S. Cl.
USPC ............. 99/409; 99/403; 99/419; 99/421 H; 99/421 R

(58) Field of Classification Search
USPC ............. 99/409, 403, 404, 407, 419, 421 H, 99/421 HV, 413, 421 R, 421 V
See application file for complete search history.

(56) References Cited

U.S. PATENT DOCUMENTS

| 1,786,300 | A | * | 12/1930 | Monroe | 99/341 |
| 2,753,436 | A | * | 7/1956 | Schwaneke | 219/441 |
| 6,220,152 | B1 | * | 4/2001 | Baldwin et al. | 99/427 |
| 6,708,603 | B1 | * | 3/2004 | Li-Chen | 99/409 |
| 6,834,577 | B2 | * | 12/2004 | Xu | 99/409 |
| 7,237,476 | B1 | * | 7/2007 | Bourgeois et al. | 99/340 |
| 2006/0112837 | A1 | * | 6/2006 | Gabrielle | 99/419 |
| 2009/0217824 | A1 | * | 9/2009 | Longhi | 99/409 |

* cited by examiner

*Primary Examiner* — Reginald L Alexander
(74) *Attorney, Agent, or Firm* — McCormick, Paulding & Huber LLP

(57) ABSTRACT

A frying apparatus includes a container for holding a volume of oil, a basket dimensioned to be received in the container, a spit rod supported by said basket, and a motor having an output shaft configured for engagement with said spit rod for rotating said spit rod in relation to said basket.

11 Claims, 9 Drawing Sheets

FRYING APPARATUS AND METHOD

CROSS-REFERENCE TO RELATED APPLICATIONS

This application is a divisional application of, and claims priority to, U.S. Application Ser. No. 13/286,583, filed on Nov. 1, 2011, entitled "FRYING APPARATUS AND METHOD," which is hereby incorporated by reference in its entirety.

FIELD OF THE INVENTION

The present invention relates generally to food cooking devices and, more particularly, to a frying apparatus and method for frying turkeys and other food items.

BACKGROUND OF THE INVENTION

Various frying devices exist for frying food items such as whole turkeys. Known frying devices generally include a pot of a sufficient size to accommodate a whole turkey therein and a heating element for heating a volume of oil within the pot. While existing frying devices are generally suitable for what is regarded as ordinary performance, there is room for improvement in terms of safety, convenience and cost. In particular, known frying devices are somewhat expensive to operate because of the large quantity of oil required. In addition, known devices may pose various safety hazards and fire risks because of their susceptibility to splashing or spilling, especially during insertion and removal of a food item such as a turkey.

SUMMARY OF THE INVENTION

It is an object of the present invention to provide a frying apparatus for cooking whole turkeys and other food items.

It is an object of the present invention to provide a frying apparatus that utilizes a reduced volume of oil.

It is an object of the present invention to provide a frying apparatus that is less prone to spilling and splashing.

These and other objects are achieved by the present invention.

A frying apparatus according to an embodiment of the present invention includes a container for holding a volume of oil, a basket dimensioned to be received in the container, a spit rod supported by said basket, and a motor having an output shaft configured for engagement with said spit rod for rotating said spit rod in relation to said basket.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
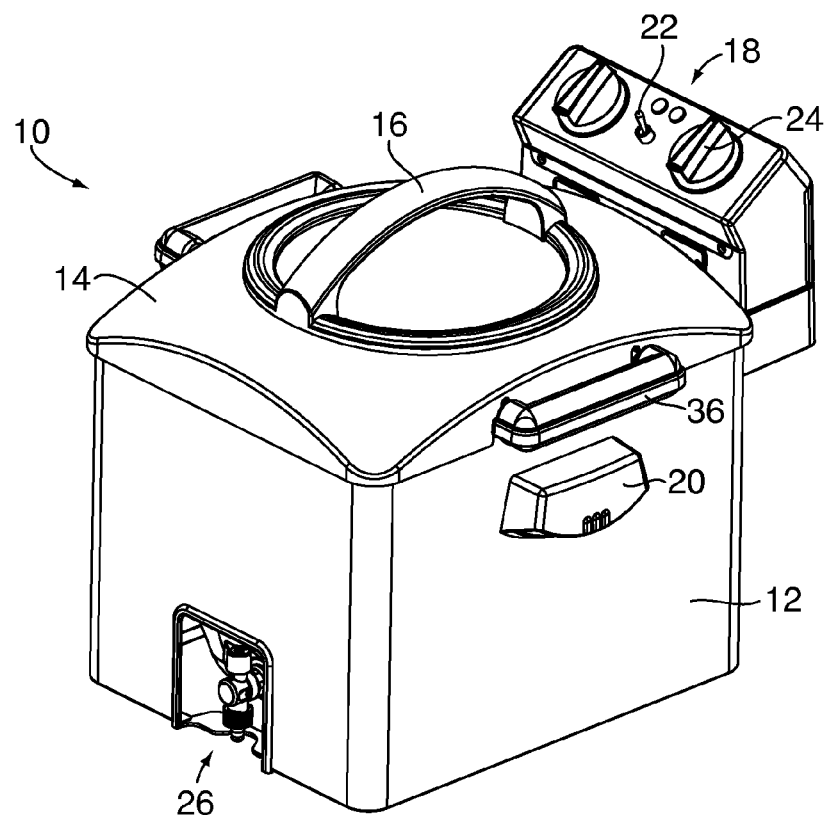
FIG. 1 is a perspective view of a frying apparatus according to a first preferred embodiment of the present invention.

Referring generally to FIGS. 1-6, a frying apparatus 10 according to a first preferred embodiment of the present invention comprises a generally rectangular vessel or basin 12 having an open top and configured to accommodate a volume of oil therein, a cover 14 removably accommodated on the basin 12 and having a handle 16, a control panel 18 and a heating element (not shown). The heating element is of the type known in the art, and may be an electrical heating element, although other types of heating elements may be utilized without departing from the broader aspects of the present invention. The basin 12 includes a pair of handles 20 on opposing sides thereof for moving and positioning the apparatus 10, as desired. The control panel 18 may include a switch 22 in electrical communication with the heating element for controlling the heating element between an ON position and an OFF position, and a plurality of knobs 24 for controlling one or more of a temperature of the oil in the basin 12 and an amount of time that the heating element is in the ON position. Alternatively, the one of the knobs 24 may control the ON/OFF position of the heating element and the switch may control a motor having a rotating output shaft, as discussed in detail below.

Figure 2:
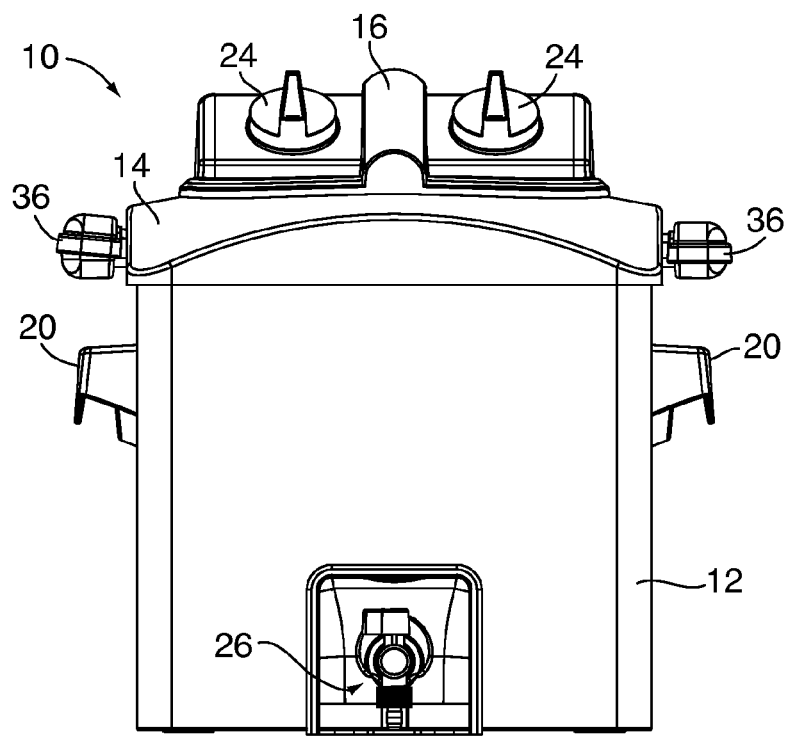
FIG. 2 is a front elevational view of the frying apparatus of FIG. 1.
Figure 3:
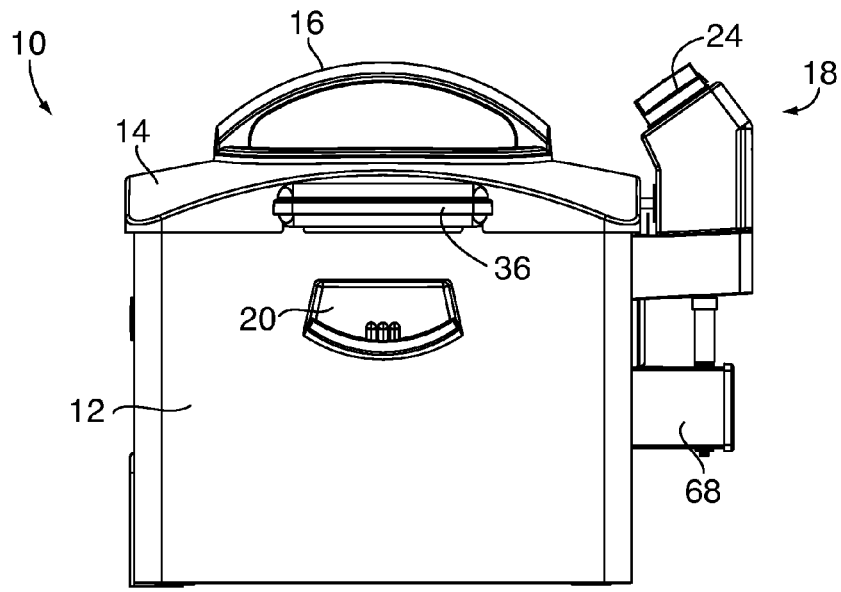
FIG. 3 is a right side elevational view of the frying apparatus of FIG. 1.
Figure 4:
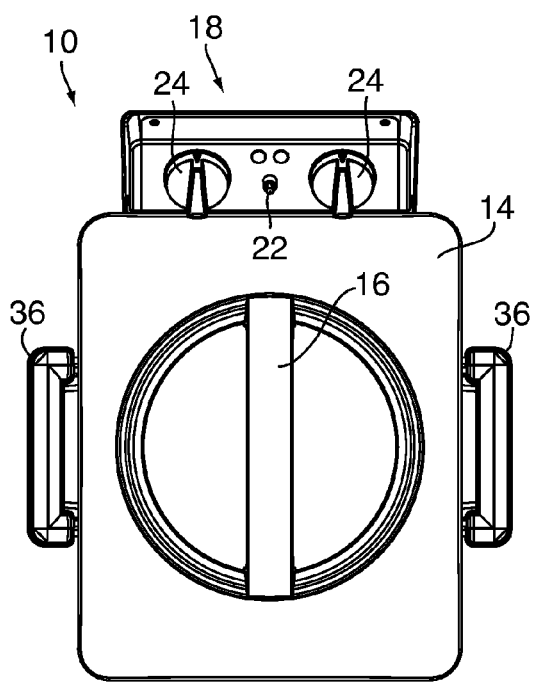
FIG. 4 is a top plan view of the frying apparatus of FIG. 1. thereof.

As best shown in FIGS. 1 and 2, the apparatus 10 may include a spigot 26 controllable between an open position and a closed position for draining oil from the basin 12 subsequent to use. The spigot 26 is preferably located on a front side of the apparatus 10, opposite the control panel 18, although other locations of the spigot 26 are certainly possible without departing from the broader aspects of the present invention.

Figure 5:
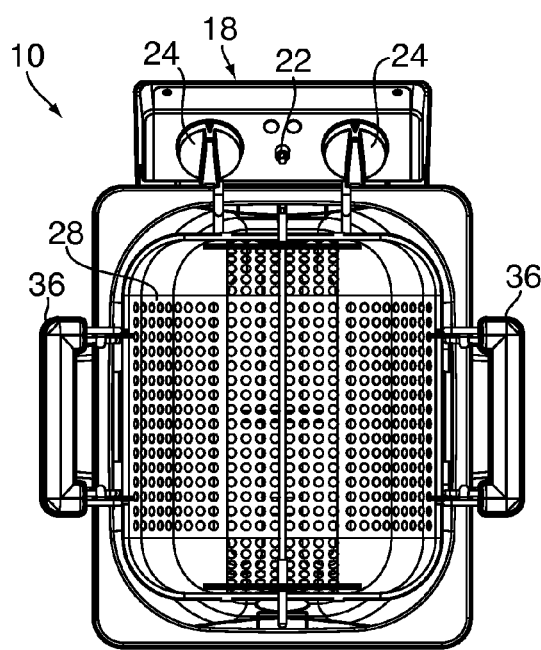
FIG. 5 is a top plan view of the frying apparatus of FIG. 1 with the cover removed.

As shown in FIG. 5, the apparatus 10 also includes a basket 28 that is received in the basin 12. The basket 28 is generally rectangular in shape and is dimensioned so as to be accommodated within the basin 12.

Figure 6:
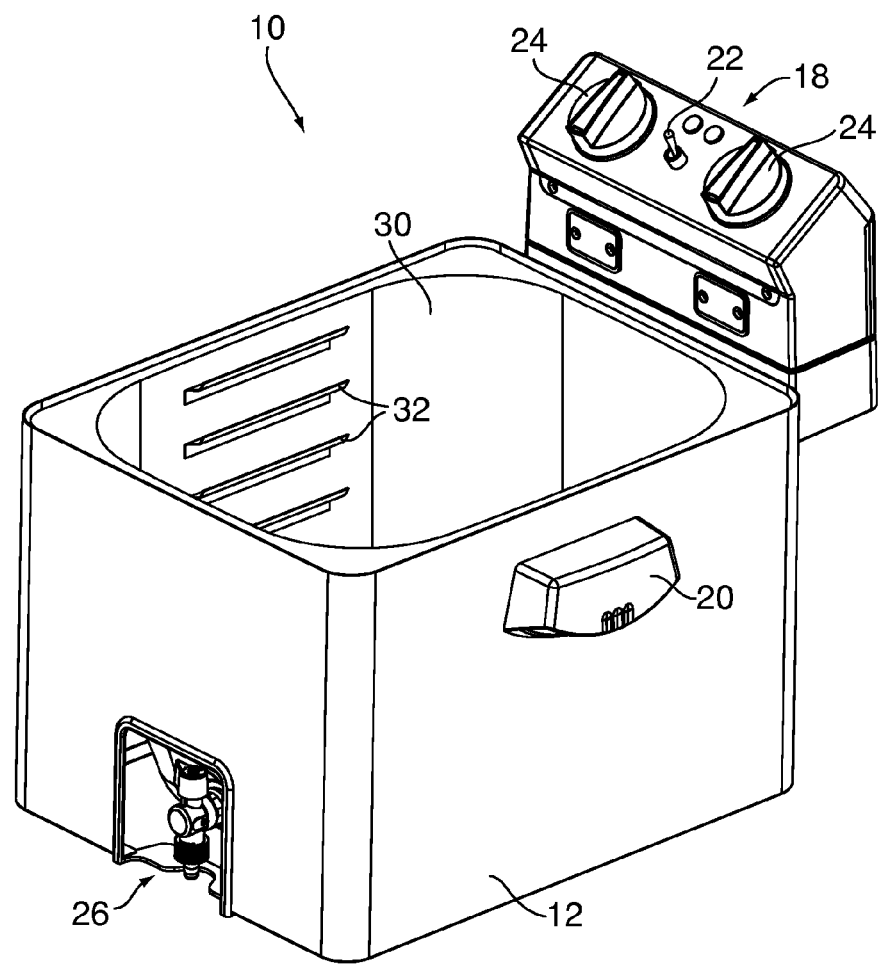
FIG. 6 is a perspective view of the frying apparatus of FIG. 1 with the cover removed.
Figure 7:
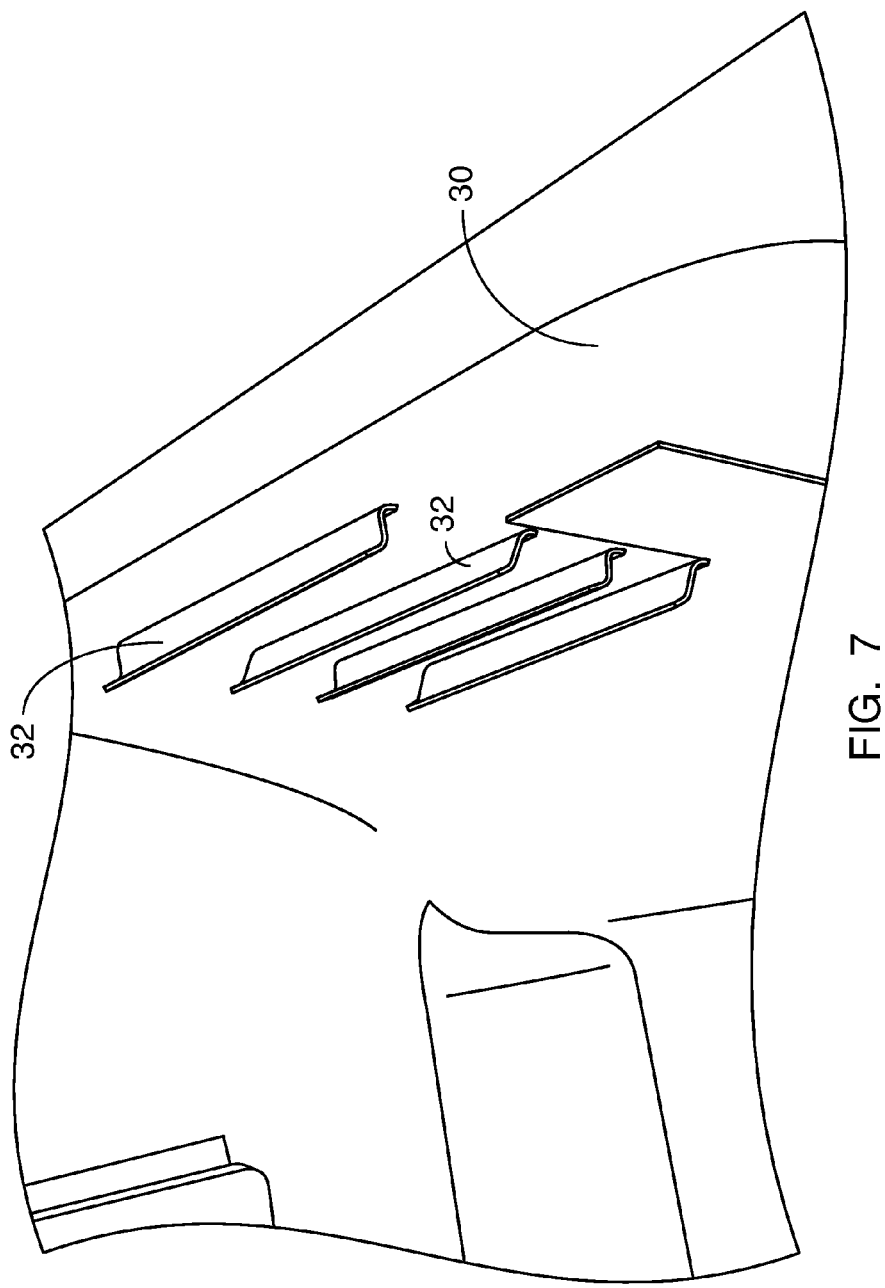
FIG. 7 is a detail view of an interior sidewall of the frying apparatus of FIG. 1 showing safety catches.

Turning now to FIG. 6, the interior sidewalls 30 of the basin 12 include a plurality of generally horizontally extending and vertically aligned position stops or catches 32. In the preferred embodiment, at least two opposing sidewalls 30 have a substantially identical array of catches 32. In particular, the opposing sidewalls 30 each have an identical number of catches 32 protruding therefrom, and the catches 32 on each sidewall 30 are spaced at substantially the same distance from a top lip of the basin 12 such that each catch 32 has a counterpart catch 32 on the opposing sidewall 30. FIG. 7 is a detail view of the safety catches 32.

Figure 8:
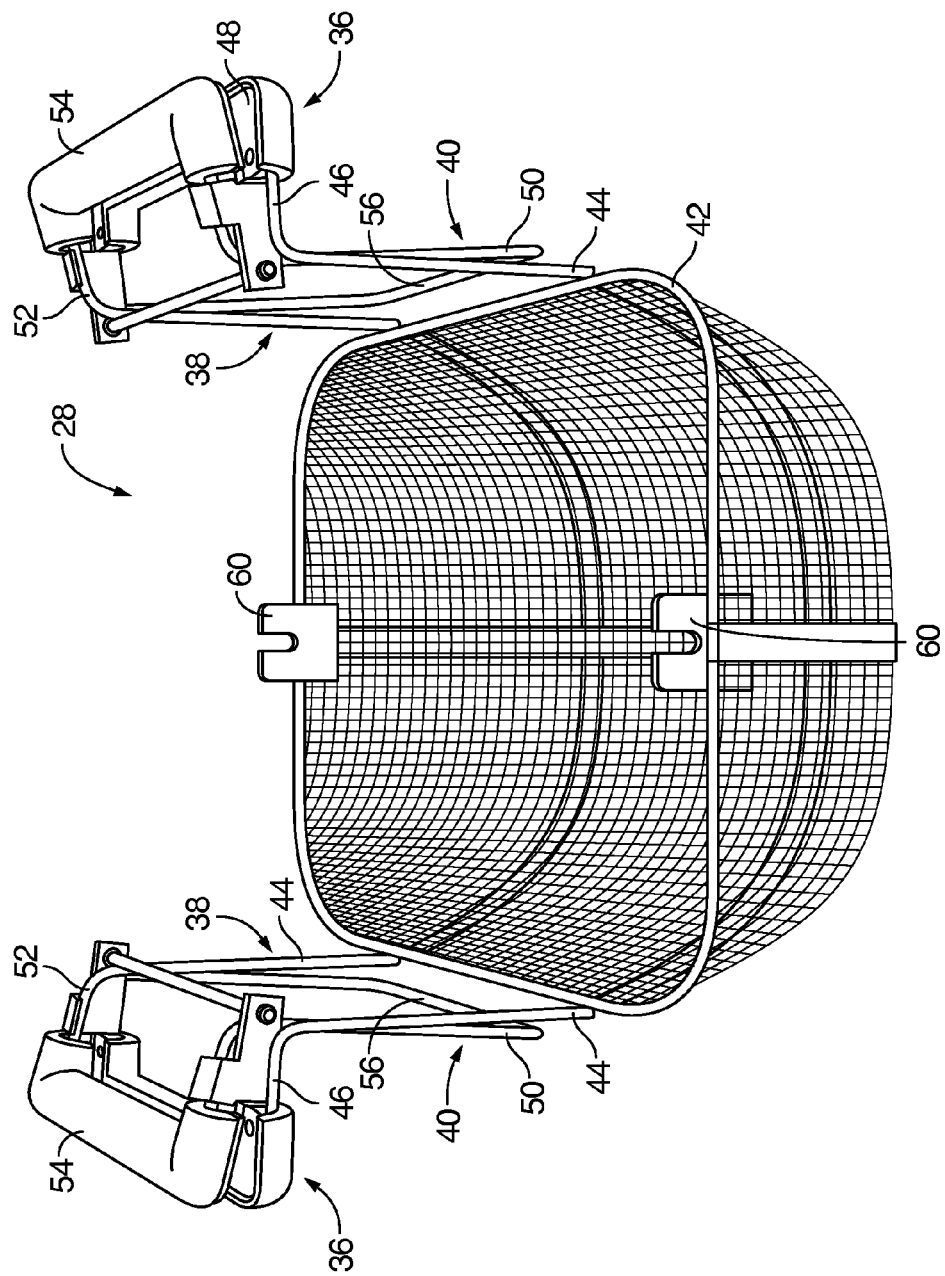
FIG. 8 is a perspective view of a basket for use with the frying apparatus of FIG. 1.
Figure 9:
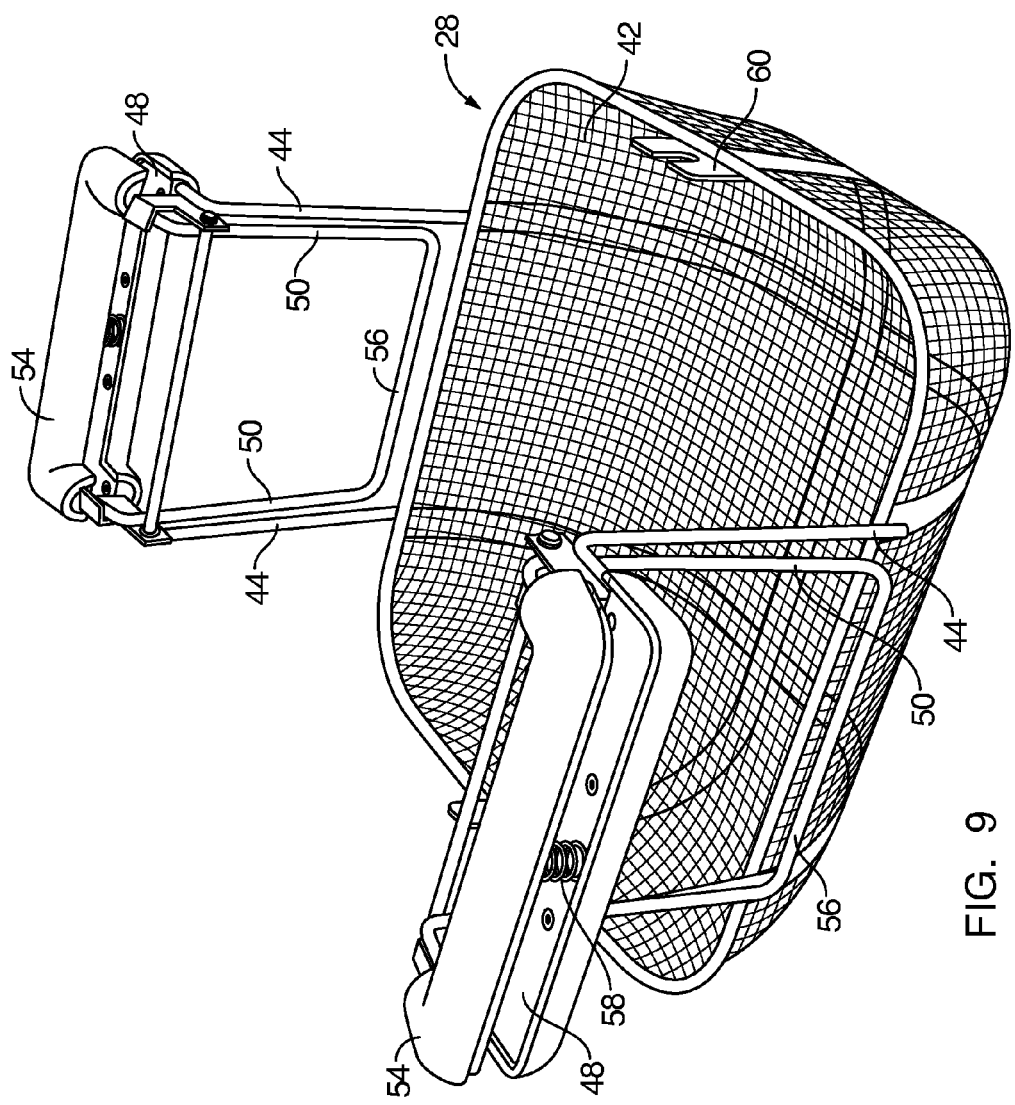
FIG. 9 is another perspective view of the basket of FIG. 7.
Figure 10:
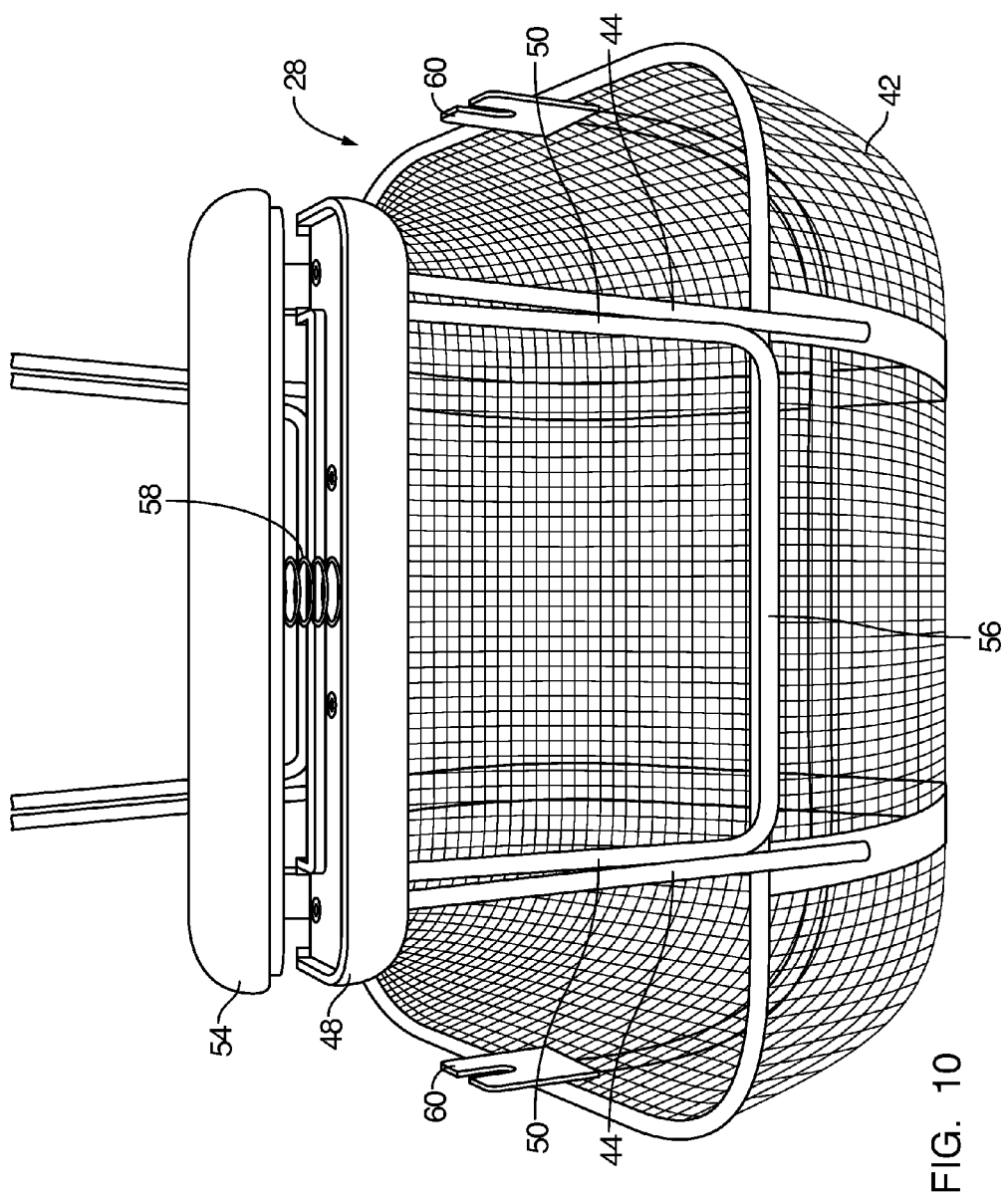
FIG. 10 is another perspective view of the basket of FIG. 7 showing a handle-controlled safety mechanism.

Referring now to FIGS. 8-10, the configuration of the basket is shown. As shown therein, the basket 28 is generally rectangular in shape and is dimensioned to be accommodated within the basin 12. The basket 28 may be formed of mesh or may be a unitary metal structure having a plurality of apertures therein for allowing oil to drain through the basket 28 and back into the basin 12 upon removal of the basket 28 from the oil. The basket 28, in addition to being sized so as to be received by the basin 12, is sized to support and accommodate a whole turkey 34 therein, as discussed in detail hereinafter.

As best shown in FIG. 8, the basket 28 includes a pair of handles 36 on opposed longitudinal sides thereof that provide both lifting and safety functions, as hereinafter discussed. Each handle 36 includes a lifting arm 38 and a safety arm 40. As shown in FIG. 8, the lifting arms 38 are rigidly secured to the basket base 42 and include first leg members 44 that extend upwardly from the basket base 42 in a generally vertical direction, and second leg members 46 that extend substantially horizontally outwards at a right angle from the first leg members 44. As shown in FIG. 8, the lifting arms 38 generally take the form of an inverted "L." A lower gripping member 48 having a generally planar upper surface is attached to the distal end of the second leg members 46.

The safety arms 40 have substantially the same shape as the lifting arms 38 described above. In particular, the safety arms 40 include first leg members 50 that extend generally vertically and second leg members 52 that extend generally horizontally outward at a right angle from the first leg members 50. An upper gripping member 54 having a generally planar bottom surface is attached to the distal end of the second leg members 52. Importantly, the safety arms 40 also include a catch engagement member 56 that joins the distal ends of the first leg members 50 and that is oriented horizontally and extends in a direction generally parallel to the longitudinal sides of the basket 28.

The safety arms 40 are mounted to the lifting arms 38 for pivotal movement in relation thereto. As shown in FIGS. 8 and 9, the safety arms 40 are mounted to the lifting arms 38 adjacent the respective ninety-degree bends in each arm such that the generally planar lower surface of the upper gripping member 54 and the generally planar upper surface of the lower gripping member 48 are facing one another. As best shown in FIGS. 9 and 10, the handles 36 further include a coil spring 58 positioned between the upper and lower gripping members 54, 48 of the handles 36. The spring 58 biases the upper gripping member 54 away from the lower gripping member 48 such that the catch engagement member 56 of each safety arm 40 is urged outwardly and away from the sides of the basket 28.

When a user engages the gripping members 48, 54 and squeezes them together such as to lift the basket 28, the upper gripping member 54 is urged downwardly into contact with the lower gripping member 48, against the spring bias, causing the safety arm 40 to pivot relative to the lifting arm 38 such that the first leg members 50 of the safety arm 40 are brought into a position where they are generally parallel to the first leg members 44 of the lifting arm 38 and the whereby the catch engagement member 56 is urged towards the longitudinal sides of the basket 28. When a user release the gripping members 48, 54, the bias of the coil spring 58 pushes the upper gripping member 54 away from the lower gripping member 48, thereby causing the safety arm 40 to pivot relative to the lifting arm 38 such that the catch engagement member 56 is urged outwards and away from the longitudinal sides of the basket 28.

As will be readily appreciated, the configuration of the handles 36 is an important aspect of the present invention. During turkey frying, a user must come into close proximity with the heated oil in order to lower the turkey 34 or other food item into the oil for cooking. As the turkey 34 is slowly lowered into the hot oil, however, splashes of oil on a user's skin may cause a user to reflexively drop the turkey 34 into the oil, therefore splashing larger amounts of hot oil which can result in fires or more serious burns.

In contrast to know frying devices, however, the present invention ensures that it is impossible for the entire turkey 34 and basket 28 to be inadvertently dropped into the hot oil in the basin 12. In particular, with the present invention, the basket 28, and thus the turkey 34, cannot be lowered into the basin of oil until a user grips the handles 36 and causes the upper gripping member 54 to be moved into contact with the lower gripping member 48 so that the catch engagement members 56 are urged inwards towards the sides of the basket 28. With the catch engagement members 56 in this inward position, a user can slowly lower the basket into the basin 12 because the catch engagement members 56, in their inwardly biased position, clear the catches 32 on the interior sidewalls 30 of the basin 12.

During this step of lowering the turkey 34 into the basin 12, if a user is burned by small amounts of splashing oil and reflexively lets go of the handles 36, the basket 28 and turkey 34 will not plunge into the vat of bubbling oil. When a user lets go of the handles 36, the lack of hand pressure on the upper gripping member 54 causes the coil spring 58 to exert its biasing force on the upper gripping member 54 to push it away from the lower gripping member 48, thereby causing the safety arm 40 to rotate relative to the lifting arm 38 and causing the catch engagement member 56 to be urged outwards towards the sidewalls 30 of the basin 12. The catches 32 on the sidewalls 30 of the basin will engage the outwardly biased catch engagement members 56 on each side of the basket 28 to prevent the basket 28 and turkey 34 from plunging into the hot oil. A user may then simply reengage the handles 36 to rotate the catch engagement members 56 away from the sidewalls (towards the basket 28) to disengage from the catches 32 so that he/she can continue slowly lowering the turkey 34 into the oil.

In addition, the arrangement of the handles 36 and the catches 32 provides for a means of conveniently draining the turkey 34 of excess oil subsequent to frying. In particular, after the turkey is cooked in the oil, a user can engage the handles 36 of the basket 28 to lift the turkey 34 out of the oil. Rather than having to manually support the weight of the basket 12 and turkey 34 above the oil until the excess oil has drained off into the basin 12, a user can lift the turkey 34 up to a desired height above the oil and release the upper gripping members 54 so that the catch engagement members 56 swing outwards and engage two of the variable height catches 32 on the basin sidewalls 30. Once the basket 28 and turkey 34 are supported by the variable height catches 32, a user can completely let go of the handles 36 and leave the turkey 34 to rest until the excess oil has drained. In this manner, the handles 36 and catches 32 are actually dual purpose, providing for both safety and convenience in draining.

With further reference to FIGS. 8-10, a pair of rotisserie support brackets 60 having an upwardly facing slot are fixedly mounted to opposed lateral sides of the basket 28 and extend upwards from a top lip thereof. The brackets 60 are aligned and configured so as to support a spit rod 62 thereon.

Figure 11:
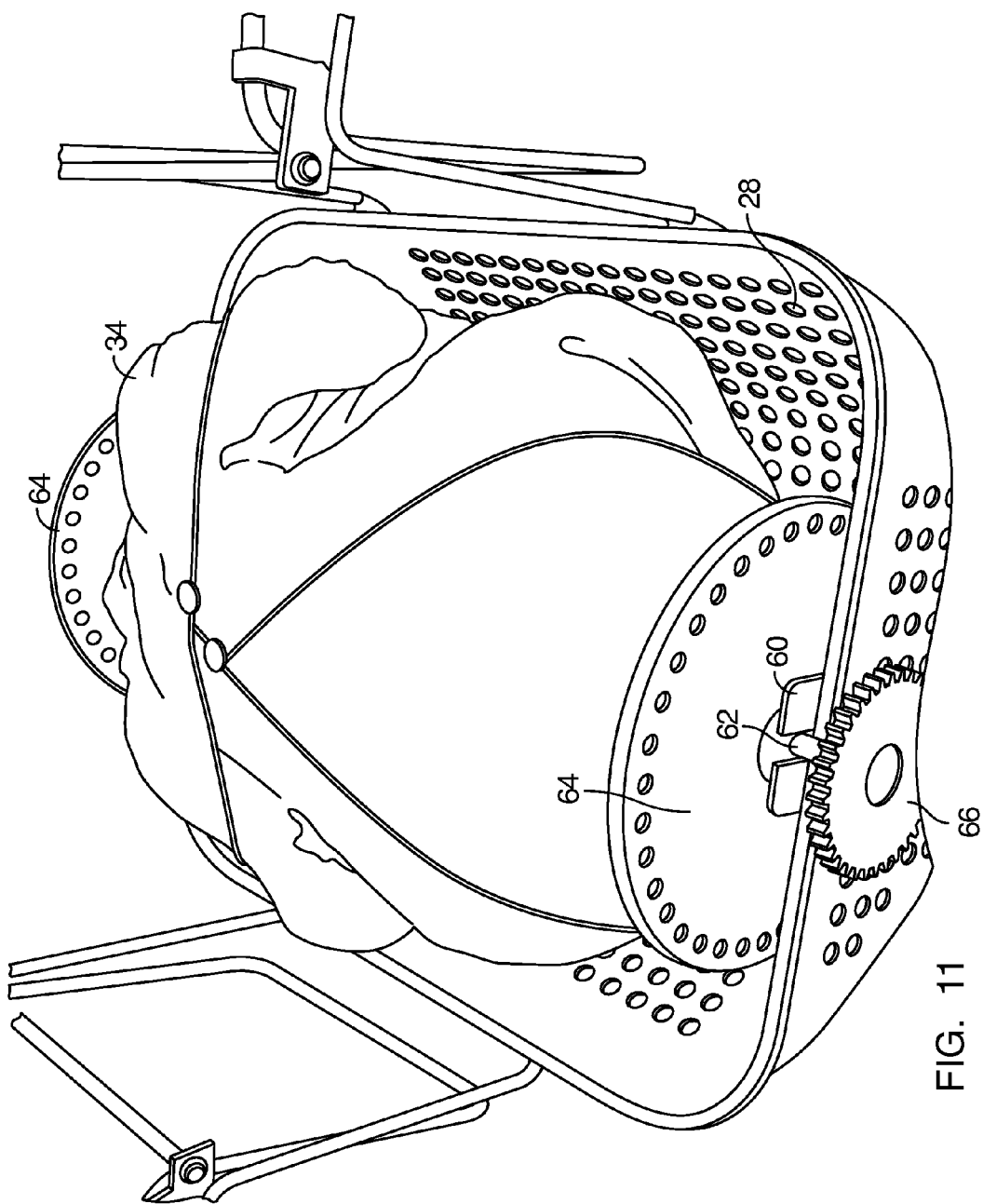
FIG. 11 is a perspective view of a turkey secured in position within the basket of FIG. 7.
Figure 12:
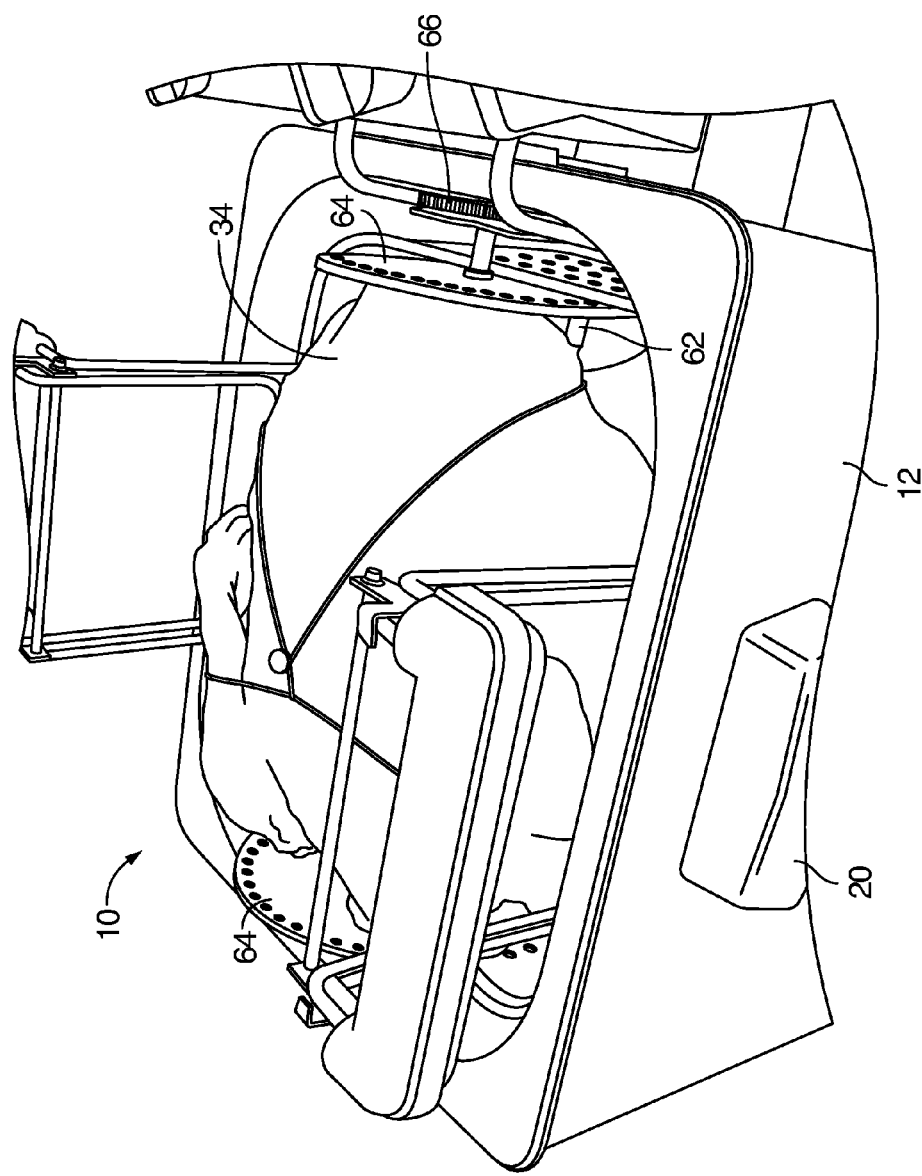
FIG. 12 is a perspective view of the frying apparatus of FIG. 1 in operation.

As best shown in FIGS. 11 and 12, two locating plates 64 are slidably received on the spit rod 62 for accommodating a whole turkey 34 or other food item therebetween. As will be readily appreciated, the locating plates 64 retain the turkey 34 in a centered location on the spit rod 62 and prevent the turkey 34 from sliding down the rod 62 where it could potential rub against the sides of the basket 28 or the support brackets 60. As shown in FIG. 11, at least one end of the spit rod 62 includes a gear 66. The gear 66 is configured for engagement with a complimentary gear (not shown) on an output shaft of a rotisserie motor 68. The rotisserie motor 68 may be housed beneath the control panel 18 and arranged such that the output shaft of the motor 68 extends into the basin 12 in a position where there output shaft gear may engage the gear 66 mounted on the spit rod 62. In an alternative embodiment, the rotisserie motor may be a separate component.

In the preferred embodiment, the rotisserie motor 68 is electrically coupled to the control panel 18 such that a user may control operation thereof from the control panel 18. In particular, in the preferred embodiment, a user may activate/deactivate the motor 68 from the control panel 18 by, for example, flipping a switch, and may even control the speed of rotation of the spit rod 62 and turkey 34 by turning a knob.

In operation, a user first pours a volume of cooking oil into the basin 12 and turns the apparatus 10 on to heat the oil. In the preferred embodiment, the basin 12 is filled to a level where only half of the turkey or food item will be submerged when the basket 28 is lowered into the basin 12. A user then prepares the turkey for frying by inserting the whole turkey 34 or other food item on the spit rod 62 so that it comes to rest on one of the locating plates 64. The other locating plate 64 is then slid onto the spit rod 62. In an embodiment, the turkey 34 may be further restrained by twine or a cable that may be wrapped around the turkey 34 and secured to one or more apertures in the locating plates 64. The turkey 34 is then placed in the basket 28 such that the ends of the spit rod 62 are supported by brackets 60, as shown in FIG. 11. A user then grips the handles 36, causing the catch engagement members 56 of the safety arms 40 to move inwards, and lowers the basket 28 into the basin 12 filled with hot oil until the teeth of the gear 66 on the spit rod 62 mesh with the teeth of the gear on the output shaft of the rotisserie motor 68.

As noted above, in the preferred embodiment, in its lowered position, the turkey 34 is approximately only half submerged in the oil. This position is shown in FIG. 12. Once in position, a user actuates a switch on the control panel 18 to activate the motor 68. The rotation of the output shaft and gear of the motor 68 causes the spit rod 62 to rotate within the support brackets 60, thus causing the turkey 34 to rotate. As will be readily appreciated, at any given time, half of the turkey will be submerged in the oil and the other half will be above the oil. Throughout cooking, however, each half of the turkey will be cycled in and out of the oil via rotation of the spit rod 62.

After the turkey 34 is sufficiently cooked, a user may turn off the heating element, grip the handles 34 and lift the basket 28 to a desired height above the oil. A user can then release the upper gripping members 54 so that the catch engagement members 56 engage the catches 32 on the sidewalls 30, as discussed above. The turkey 34 may then rest in this draining position so that the excess oil drains into the basin 12. Once complete, a user can utilize the spigot 26 to drain the oil from the basin 12 for disposal, or into a container for subsequent reuse.

As will be readily appreciated, the rotationally driven mount is an important aspect of the present invention. In particular, rotating the turkey allows less oil to be used since it is not necessary to completely submerge the turkey for frying, in contrast to existing frying devices. By using less oil, the burning and spilling hazard is also decreased. In addition, less oil equates to less mess, a decrease in both material and operating costs, less time to heat up and may even result in faster cooking times.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A frying apparatus, comprising:
a container for holding a volume of oil;
a basket dimensioned to be received in said container, said basket including a pair of handles;
a spit rod supported by said basket;
a motor having an output shaft configured for engagement with said spit rod for rotating said spit rod in relation to said basket; and
wherein said handles include an upper gripping member, a lower gripping member and a spring disposed between said upper and lower gripping members, said spring biasing said upper gripping member away from said lower gripping member.

2. The frying apparatus of claim 1, wherein:
said spit rod is oriented substantially horizontally.

3. The frying apparatus of claim 1, wherein:
said spit rod includes a first gear having a plurality of teeth on a distal end thereof; and
said output shaft includes a second gear having a plurality of teeth configured to mesh with said teeth of said first gear.

4. The frying apparatus of claim 1, further comprising:
a control panel in electrical communication with said motor and configured to control said motor between an ON state and an OFF state.

5. The frying apparatus of claim 4, wherein:
said control panel is further configured to control a frequency of rotation of said output shaft.

6. The frying apparatus of claim 1, wherein:
a longitudinal axis of said spit rod is positioned just below a surface of said oil when said basket is in a cooking position.

7. The frying apparatus of claim 1, further comprising:
a heating element in thermal communication with said container for heating said volume of oil in said container.

8. The frying apparatus of claim 1, further comprising:
a pair of locating plates slidably received on said spit rod and limiting a range of movement of a food item on said spit rod.

9. The frying apparatus of claim 1, wherein:
said basket includes a pair of handles and at least one catch member, said at least one catch member being movable between a safety position in which said catch member is biased away from said basket and towards internal sidewalls of said container, and a clearance position in which said catch member is urged inwards towards said basket and away from said internal sidewalls;
wherein when in said safety position said catch member is configured to engage a catch protruding from said internal sidewalls of said container.

10. The frying apparatus of claim 9, wherein:
urging said catch member to said safety position; and
wherein said upper gripping member is movable against said spring bias toward said lower gripping member to urge said catch member to said clearance position.

11. The frying apparatus of claim 1, further comprising:
a spigot located adjacent a bottom of said container and being controllable between an open position and a closed position.

* * * * *